(12) United States Patent
Ferracane et al.

(10) Patent No.: US 11,846,612 B2
(45) Date of Patent: Dec. 19, 2023

(54) COMPACT MATERIAL TESTING SYSTEM

(71) Applicant: OREGON HEALTH & SCIENCE UNIVERSITY, Portland, OR (US)

(72) Inventors: Jack Ferracane, Portland, OR (US); Carmem Pfeifer, Portland, OR (US); Rafael Tiago Patzlaff, Luzerna-Santa Catarina (BR)

(73) Assignee: Oregon Health & Science University, Portland, OR (US)

(*) Notice: Subject to any disclaimer, the term of this patent is extended or adjusted under 35 U.S.C. 154(b) by 54 days.

(21) Appl. No.: 17/660,204

(22) Filed: Apr. 21, 2022

(65) Prior Publication Data

US 2022/0349792 A1    Nov. 3, 2022

Related U.S. Application Data

(60) Provisional application No. 63/182,490, filed on Apr. 30, 2021.

(51) Int. Cl.
*G01N 3/12* (2006.01)
*G01N 3/10* (2006.01)

(52) U.S. Cl.
CPC ....... *G01N 3/12* (2013.01); *G01N 2203/0044* (2013.01); *G01N 2203/0208* (2013.01);
(Continued)

(58) Field of Classification Search
CPC ............ G01N 3/12; G01N 2203/0044; G01N 2203/0208; G01N 2203/0226; G01N 2203/0242; G01N 2203/0676; G01N 3/10; G01N 35/1002; G01N 35/1074; G01N 3/56; G01N 33/30; G01N 19/02;
(Continued)

(56) References Cited

U.S. PATENT DOCUMENTS 6,546,782 B1   4/2003   De La Cruz et al.
7,694,593 B2   4/2010   Owens et al.
(Continued)

OTHER PUBLICATIONS

Khvostenko, et al., "Cyclic mechanical loading promotes bacterial penetration along composite restoration marginal gaps", Academy of Dental Materials, published Mar. 24, 2015, 9 pages.
(Continued)

*Primary Examiner* — Brandi N Hopkins
(74) *Attorney, Agent, or Firm* — Stoel Rives LLP (57) ABSTRACT

A compact material testing system is configured to expose multiple samples housed within separate sample chambers to simulated fluid, thermal, and mechanical loading conditions. The system includes multiple independent load actuators positioned to extend actuator rods into corresponding sample chambers to apply mechanical loading to the test sample within. A fluid control system is included to bathe each test sample in a fluid medium and replenish the fluid medium within its sample chamber as needed. Each sample chamber includes a gas inlet and gas outlet to provide non-turbulent circulation and control of atmospheric composition above the fluid medium inside the chamber. A logic programmable controller is provided for input of test parameters and automated simultaneous control of mechanical loading, fluid flow, and temperature in the sample chambers.

13 Claims, 8 Drawing Sheets

(52) U.S. Cl.
CPC ............... *G01N 2203/0226* (2013.01); *G01N 2203/0242* (2013.01); *G01N 2203/0676* (2013.01)

(58) Field of Classification Search
CPC ......... G01N 2203/0232; G01M 99/007; B01L 3/502738; B01L 3/502715; A61B 5/150961; G01K 13/12; C12N 5/0062; C12M 23/01
See application file for complete search history.

(56) References Cited

U.S. PATENT DOCUMENTS

| | | | |
|---|---|---|---|
| 7,846,715 B2 | 12/2010 | Owens et al. | |
| 9,186,224 B2 * | 11/2015 | McCloskey | A61F 2/2472 |
| 2007/0169565 A1 | 7/2007 | Schulz et al. | |
| 2010/0225478 A1 | 9/2010 | Mccloskey et al. | |
| 2015/0293001 A1 * | 10/2015 | Werner | G01N 29/04 |
| | | | 73/7 |
| 2016/0341651 A1 | 11/2016 | Chinavare et al. | |

OTHER PUBLICATIONS

Khvostenko, et al., "Bioactive glass fillers reduce bacterial penetration into marginal gaps for composite restorations", Academy of Dental Materials, published Oct. 22, 2015, 9 pages.

\* cited by examiner fig.1

COMPACT MATERIAL TESTING SYSTEM

RELATED APPLICATION

This application claims priority benefit of U.S. Provisional Patent Application No. 63/182,490, filed Apr. 30, 2021, which is hereby incorporated by reference.

ACKNOWLEDGEMENT OF GOVERNMENT SUPPORT

This invention was made with government support under R01 DE021372 awarded by the National Institutes of Health. The government has certain rights in the invention.

TECHNICAL FIELD

This disclosure relates to a compact material testing system configured to expose multiple samples housed within separate sample chambers to simulated fluid, thermal, and mechanical loading conditions.

BACKGROUND INFORMATION

The oral environment poses multiple challenges for materials used in dental restoration applications. Dental materials are exposed to cyclic mechanical loading during activities such as mastication or episodes of teeth grinding. The oral cavity also undergoes fluctuations in temperature and pH, for example, when food or liquids are ingested. In addition, the presence of bacteria in the oral cavity promotes biofilm formation on material surfaces and bacterial penetration into gaps at the interface between dentin and restoration material. Accordingly, it may be desirable to characterize the behavior of candidate dental materials under these challenges, independently or in combination, in an in vitro test environment to evaluate suitability for clinical use.

Traditionally, evaluation of a material's mechanical performance and response to load bearing is carried out using a dedicated servohydraulic universal materials testing machine to apply controlled mechanical loading regimens such as cyclic loading to samples under study. These testing machines are typically a shared laboratory resource and generally have a large footprint with substantial energy and installation requirements. As such, operation of such testing machines requires specialized technical knowledge and training. In addition, most universal materials testing machines are configured with a single actuator for load application. They require specialized chambers and fixtures to be installed in the loading area to control environmental conditions such as temperature or exposure to fluid flow or bacterial attack during load cycling. In such single-actuator systems, concurrent testing of replicate samples can be problematic and requires that customized load distribution systems be devised and deployed to ensure that the same load regimen is applied to all samples simultaneously.

Thus, there is a need for a compact system, operable with minimal supervision, to simultaneously test multiple dental material samples in a simulated oral environment that uniformly recapitulates the conditions of cyclic mechanical loading, bacterial exposure and biofilm formation, and temperature control across all samples.

SUMMARY OF THE DISCLOSURE

A compact material testing system is configured for simulating fluid, thermal, and mechanical loading conditions. The material testing system can be used as a bioreactor to provide thermal and mechanical loading conditions within a simulated biological environment in the presence or absence of living cells. The materials testing system is also well-suited for material testing in non-biological applications where exposure of samples to multiple simultaneous challenges or controlled environmental conditions is needed.

The disclosed material testing system is comprised of a stage to which a load alignment frame is connected. A plurality of sample chambers are releasably secured to a mounting surface on the stage beneath the load alignment frame with each sample chamber aligned along a respective longitudinal axis. Each sample chamber includes a hollow main body positioned between a base and a lid to enclose an interior region. The base is configured for placement upon the stage and, in some embodiments, may be configured with a heating element to regulate temperature within the main body. The lid of the sample chamber includes an aperture centered along the longitudinal axis and opening into the interior of the main body. The main body includes within its interior region a support upon which a test sample can be set. Flow of the fluid medium through the main body is governed by a fluid control system comprising an inflow pump and outflow pump associated with each sample chamber.

A plurality of load actuators are mounted to the load alignment frame, each actuator including an actuator rod that is slidably movable along the longitudinal axis of a corresponding sample chamber. In a preferred embodiment, the load actuators may be pneumatic cylinders powered by a pressurized air source. Each actuator rod extends into the interior region of its respective sample chamber through the aperture in the lid to make contact with the test sample housed within. The plurality of load actuators are under the control of a load control system that is configured to apply a uniform mechanical load regimen to the test samples in each of the sample chambers.

Each of the sample chambers further includes a fluid inlet and fluid outlet on the main body to convey a fluid medium into and away from, respectively, the interior region. In a preferred embodiment, the fluid inlet is positioned below the level of the support and the fluid outlet is positioned above it to ensure that the fluid medium bathes the test sample resting upon the support. Each of the sample chambers further includes a gas inlet and gas outlet on the main body. The gas inlet and gas outlet are both positioned above the fluid outlet to provide non-turbulent gas circulation or control of atmospheric composition within the interior region above the fluid medium.

The compact material testing system includes a logic programmable controller to regulate the load control system, the fluid control system, and, when present, the heating element in the base of the sample chamber. The load control system may be programmed through the logic programmable controller to deliver a specified mechanical loading regimen to the test sample during operation. For example, a mechanical loading regimen may be specified by a combination of parameters including the magnitude of load to be delivered, the frequency of load application, the number of load cycles to be delivered, and the duration of the mechanical loading. When pneumatic cylinders are employed for load actuation in the compact material testing system, the logic programmable controller may be configured, for example, to control a pressure regulator to govern the magnitude of load applied to the test sample, a solenoid valve to govern the frequency with which mechanical load is applied and released, and a timer to specify the total duration of cyclic loading or number of loading cycles to be applied. Similarly, the fluid control system may be programmed through the logic programmable controller to regulate the rate at which inflow and outflow pumps move the fluid medium. Temperature in the material testing system, for example, the temperature of the fluid medium bathing the test sample, may also be regulated by the logic programmable controller through interface with heating elements in the bases of the sample chambers, externally placed heat lamps, or other means of heat transfer.

An aspect of the disclosed compact material testing system is that it may be configured to deliver replicate or non-replicate mechanical loading regimens to the test samples in each of the sample chambers under replicate or non-replicate conditions of fluid medium composition, fluid medium flow, and temperature. In addition, by varying the configuration of the support upon which a test sample is set or constrained, the geometry of the test sample, and the position and mode of load application to the test sample, a wide range of mechanical loading states and attendant stress-strain fields may be studied.

A further aspect of the disclosed compact material testing system is the versatility with which it may be employed to provide a user-controlled fluid, mechanical, and thermal environment for testing materials. In some embodiments, the system may be configured to maintain controlled environmental conditions that sustain living cells or organisms within the test chamber, either seeded within or onto the test sample under study, or within the fluid medium bathing the test sample, or both. In certain embodiments, the composition of the fluid medium may be used to introduce a material or biological challenge to the test sample, for example, by incorporating one or more bacteria species, biochemical agents, degradative enzymes, chemical or pharmaceutical agents, or pH-altering compositions. Based on the detailed description provided below, it will readily be appreciated by those skilled in the art that the disclosed system may also be configured to maintain the sample chambers under non-biological conditions to assess effects of mechanical, thermal, fluid composition, and fluid flow conditions on test samples.

Additional aspects and advantages will be apparent from the following detailed description of embodiments, which proceeds with reference to the accompanying drawings.

DETAILED DESCRIPTION OF EMBODIMENTS

FIGS. 1, 2, 3, 4, and 5 show various views of a disclosed material testing system 10 configured in a first embodiment. Material testing system 10 includes a stage 12 having a mounting surface 14 of generally rectangular shape to which an upright load alignment frame 16 is connected. A plurality of sample chambers 18 (three shown in FIGS. 1-5) are releasably secured by thumb screws (not shown) to mounting surface 14 of stage 12 and positioned in coplanar relationship with load alignment frame 16. A plurality of load actuators 20 (three shown in FIGS. 1-5) are fastened to load alignment frame 16. Each load actuator 20 is aligned along a longitudinal axis 22 with a corresponding one of sample chambers 18. Each load actuator 20 is coupled to an associated one of actuator rods 24 that inserts into corresponding sample chamber 18 for sliding motion along longitudinal axis 22. A load control system 26 (FIG. 9) is configured to deliver a programmed mechanical load regimen through each of load actuators 20 and its connected actuator rod 24 to a test sample 28 (FIG. 8) housed within the corresponding sample chamber 18. Material testing system 10 further comprises a fluid control system 30 (FIG. 9) that is configured to bathe each of test samples 28 in a fluid medium as a gas is circulated above the fluid medium in a non-turbulent manner.

Load alignment frame 16 is formed of a pair of vertical support posts 40 and a horizontal crossbar 42. Each vertical support post 40 has a stage end 44 and a distal end 46, and horizontal crossbar 42 has a central span 48 and a pair of crossbar ends 50. Each vertical support post 40 is connected at its stage end 44 to mounting surface 14 proximal to one of short mounting surface edges 52 and perpendicular to mounting surface 14. Horizontal crossbar 42 includes a pair of through-holes 54, each proximal to one of crossbar ends 50 and sized to receive distal end 46 of vertical support post 40. Horizontal crossbar 42 is secured to distal ends 46 of vertical support posts 40 such that it is locked in a stationary position above and parallel to mounting surface 14. Horizontal crossbar 42 includes a plurality of threaded actuator bores 56 spaced along central span 48. Each threaded actuator bore 56 is centered along a respective longitudinal axis 22 and configured to allow one of load actuators 20 to be fastened to horizontal crossbar 42 of load alignment frame 16 perpendicular to mounting surface 14.

Each of the three sample chambers 18 shown in FIGS. 1-5 includes a main body 60 positioned between a base 62 located at a mounting end 64 of sample chamber 18 and a lid 66 located at an actuator-insertion end 68 of sample chamber 18. Main body 60 is formed as a cylindrical chamber 70 having a cylinder wall 72 circumscribing an interior region 78 (FIG. 8), and includes a lid end 74 (FIGS. 6, 7) and a base end 76. Interior region 78 of main body 60 contains a support 80 (FIG. 8) upon which test sample 28 can be set and subjected to mechanical loading under controlled environmental conditions (described in more detail below).

Each base 62 at mounting end 64 of sample chamber 18 has an underside 84 (FIGS. 6, 7) with an outer perimeter 82 that is sized for placement into a corresponding recessed area 86 with a recessed perimeter 88 formed into mounting surface 14 of stage 12. Each of recessed areas 86 is positioned such that, when base 62 is placed into recessed area 86, sample chamber 18 is maintained in proper alignment along longitudinal axis 22 to receive actuator rod 24 into main body 60. Mounting surface 14 further includes threaded stage bores (not depicted) positioned in recessed areas 86 proximal to recessed perimeter 88. Each of bases 62 includes a pair of mounting slots 92 through which a thumb screw (not shown) may be passed to engage the threaded stage bores in recessed areas 86 to releasably secure sample chambers 18 to mounting surface 14 of stage 12. In some embodiments, base 62 may further include a heating element 94 (FIG. 9) incorporated within to regulate temperature of interior region 78 of sample chamber 18.

Each lid 66 of sample chamber 18 includes an aperture 100 aligned with longitudinal axis 22 through which actuator rod 24 is slidably disposed. Actuator rod 24 includes a first end 102 (FIG. 7) that extends into interior region 78 of sample chamber 18 to make physical contact with test sample 28, and a second end 104 (FIG. 7) that extends away from sample chamber 18 and is coupled to one of the plurality of load actuators 20. Load actuator 20 is configured to apply a motive force to actuator rod 24 at its second end 104 and thereby impart mechanical loading through first end 102 of actuator rod 24 to test sample 28 housed in interior region 78 of sample chamber 18.

In a preferred embodiment as depicted in FIGS. 1-4, each of load actuators 20 comprises a pneumatic cylinder 110. Each pneumatic cylinder 110 includes a main cylinder body 112, a piston (not shown) housed within main cylinder body 112, and a piston rod 118 integral with the piston and extending from main cylinder body 112 toward stage 12. Piston rod 118 is connected by a coupling member 120 to actuator rod 24. Each main cylinder body 112 includes a threaded end 122 configured to attach to horizontal crossbar 42 at one of threaded actuator bores 56. A tightening nut 124 is employed at threaded end 122 of main cylinder body 112 adjacent to threaded actuator bore 56 to provide stable fixation of each of pneumatic cylinders 110 to horizontal crossbar 42. Main cylinder body 112 also includes an air inlet end 125 opposite threaded end 122 where an air inlet 126 is positioned to receive pressurized air to actuate the piston within main cylinder body 112. An air supply line 127 connects air inlet 126 to load control system 26, described in greater detail below. During operation, the piston is actuated within main cylinder body 112 by pressurized air received through air inlet 126, causing transmission of mechanical load though piston rod 118 and coupled actuator rod 24 to test sample 28 housed within interior region 78 of main body 60 of sample chamber 18.

Figure 1:
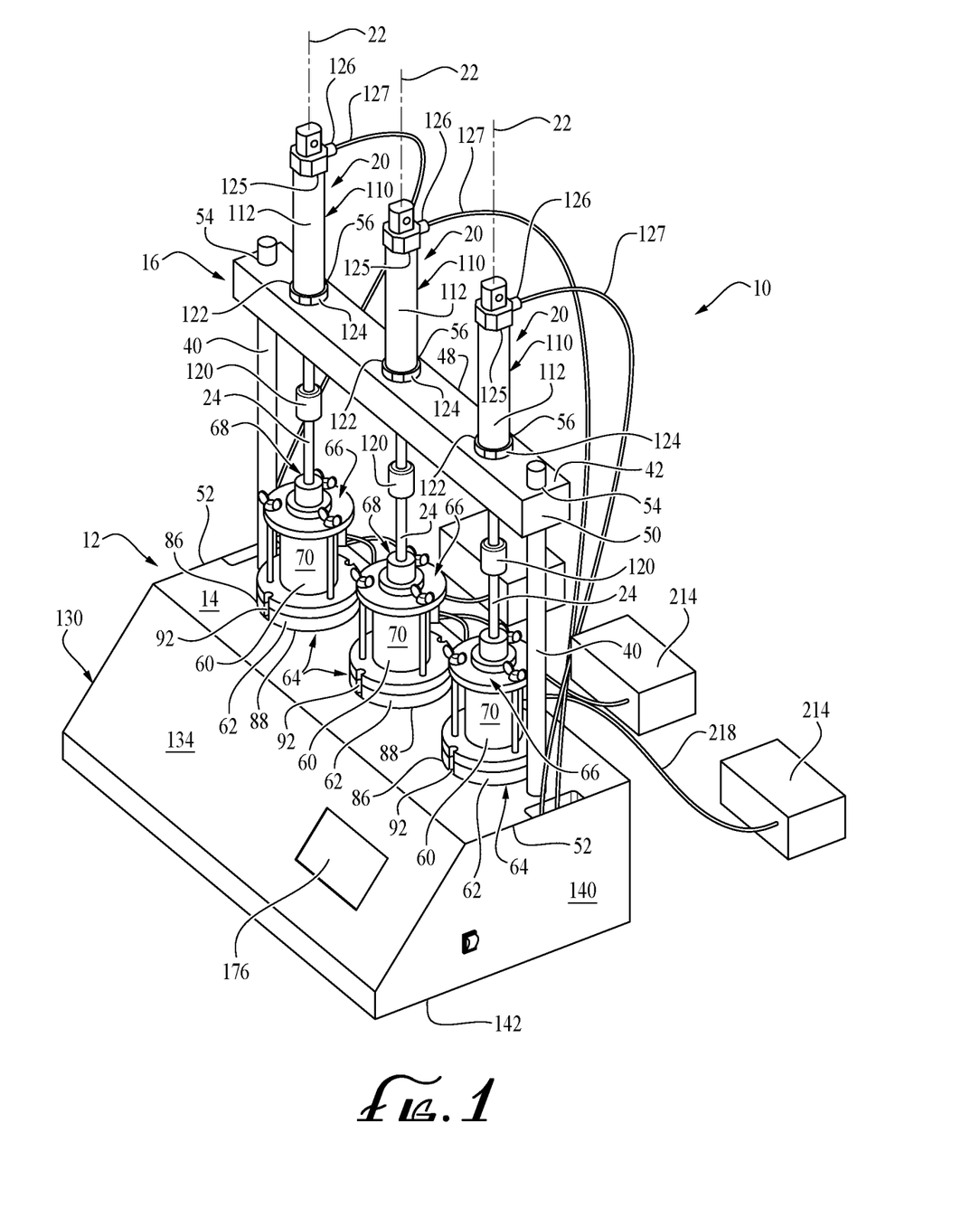
FIG. 1 is a front isometric view of an embodiment of the disclosed compact material testing system.
Figure 2:
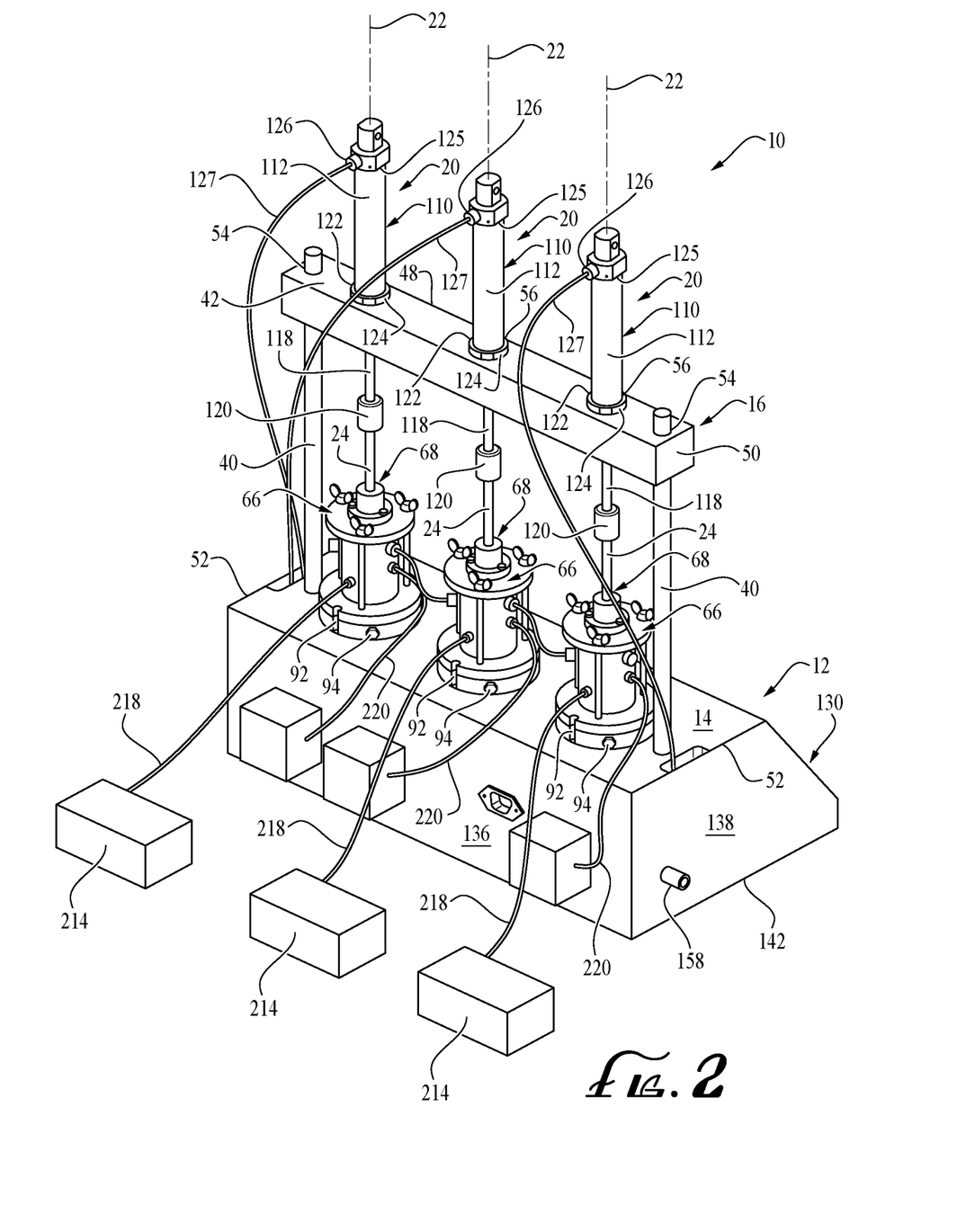
FIG. 2 is a rear isometric view of the material testing system of FIG. 1.
Figure 3:
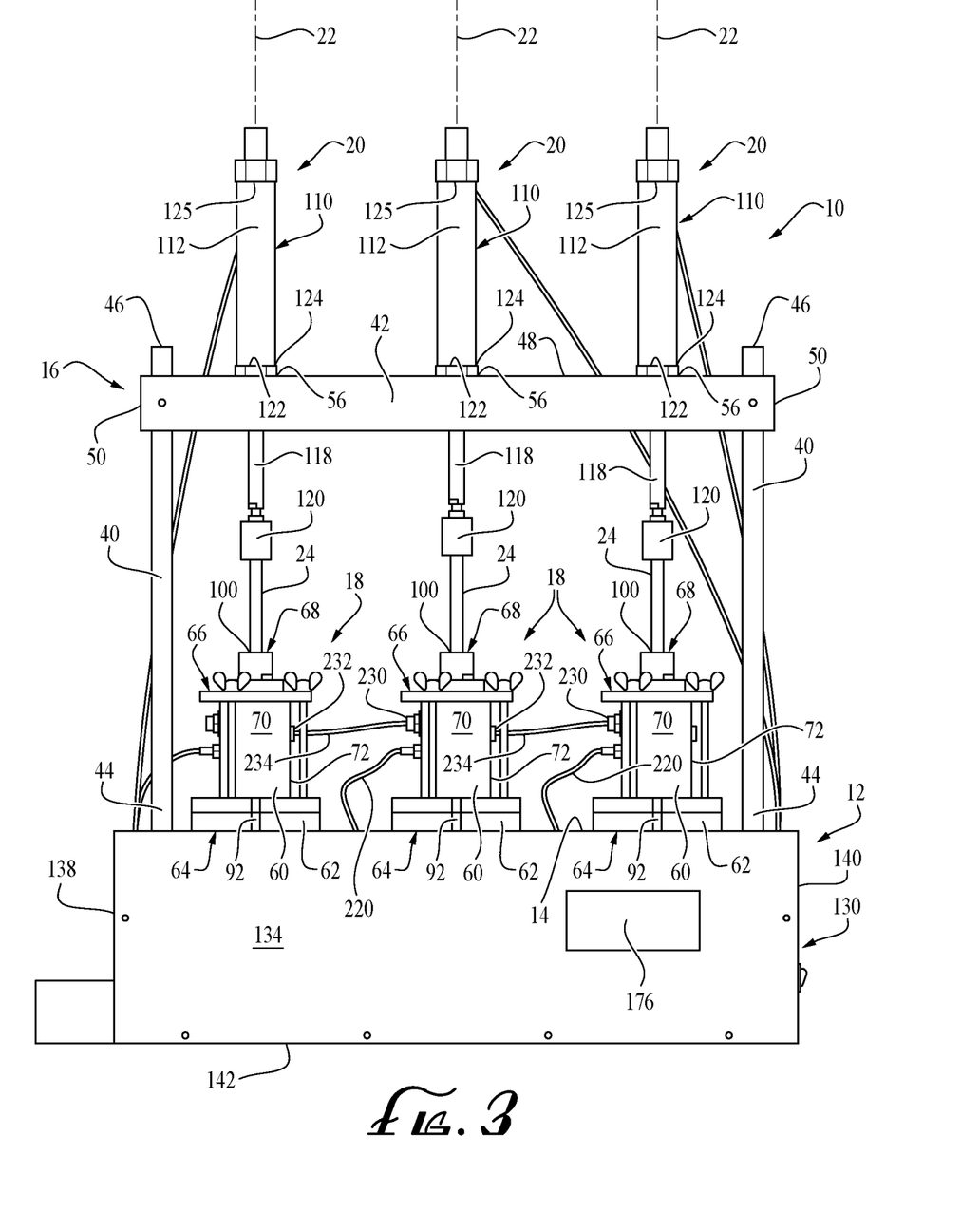
FIG. 3 is a front-side elevation view of the material testing system of FIG. 1.
Figure 4:
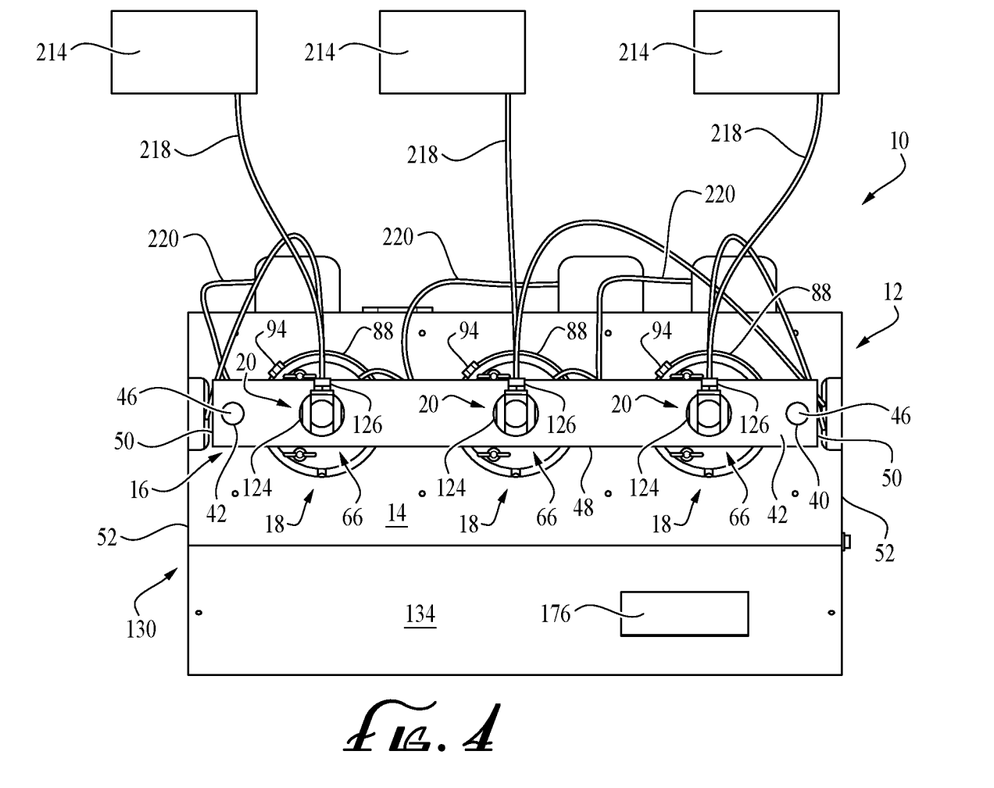
FIG. 4 is a top plan view of the material testing system of FIG. 1.
Figure 5:
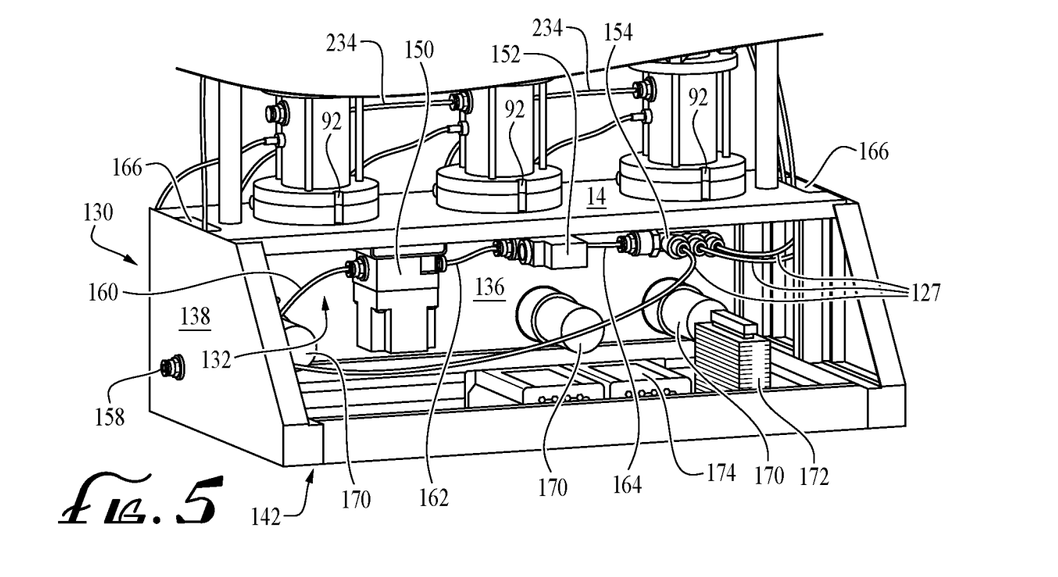
FIG. 5 is a fragmentary isometric view of the interior of the material testing system of FIG. 1.

In a preferred embodiment as depicted in FIGS. 1-4, stage 12 comprises a housing 130 that encloses an interior compartment 132 (FIG. 5). Housing 130 is bounded by a front panel 134, a rear panel 136, a first side panel 138, a second side panel 140, a bottom panel 142, and mounting surface 14 to which load alignment frame 16 is connected. FIG. 5 shows a fragmentary isometric view of material testing system 10 with front panel 134 removed from housing 130 to expose elements of load control system 26 housed within interior compartment 132. Load control system 26 includes a pressure regulator 150, a solenoid valve 152, and a branched fitting 154, each mounted inside housing 130 on rear panel 136 and together configured to deliver air from an external pressurized air source 156 (represented schematically in FIG. 9) to power the set of pneumatic cylinders 110 affixed to load alignment frame 16. An air inlet 158 entering first side panel 138 is configured to deliver air from external pressurized air source 156 via a first tubing 160 to pressure regulator 150. Pressure regulator 150 pneumatically communicates the received air via a second tubing 162 to solenoid valve 152, and solenoid valve 152 pneumatically communicates the received air via a third tubing 164 to branched fitting 154. Branched fitting 154 is configured with a plurality of air supply lines 127 (three depicted here), each of which is routed from interior compartment 132 through exit holes 166 to terminate at a respective air inlet 126 of one of pneumatic cylinders 110, thereby effecting pneumatic communication of a mechanical loading regimen from load control system 26 to all of pneumatic cylinders 110.

FIG. 5 depicts a plurality of outflow pumps 170 (three shown) mounted inside housing 130 on rear panel 136. FIG. 5 also depicts a logic programmable controller (LPC) 172 and a power supply 174 mounted inside housing 130 on bottom panel 142. The roles of these components in the function and operation of material testing system 10 are described in greater detail below.

Figure 6:
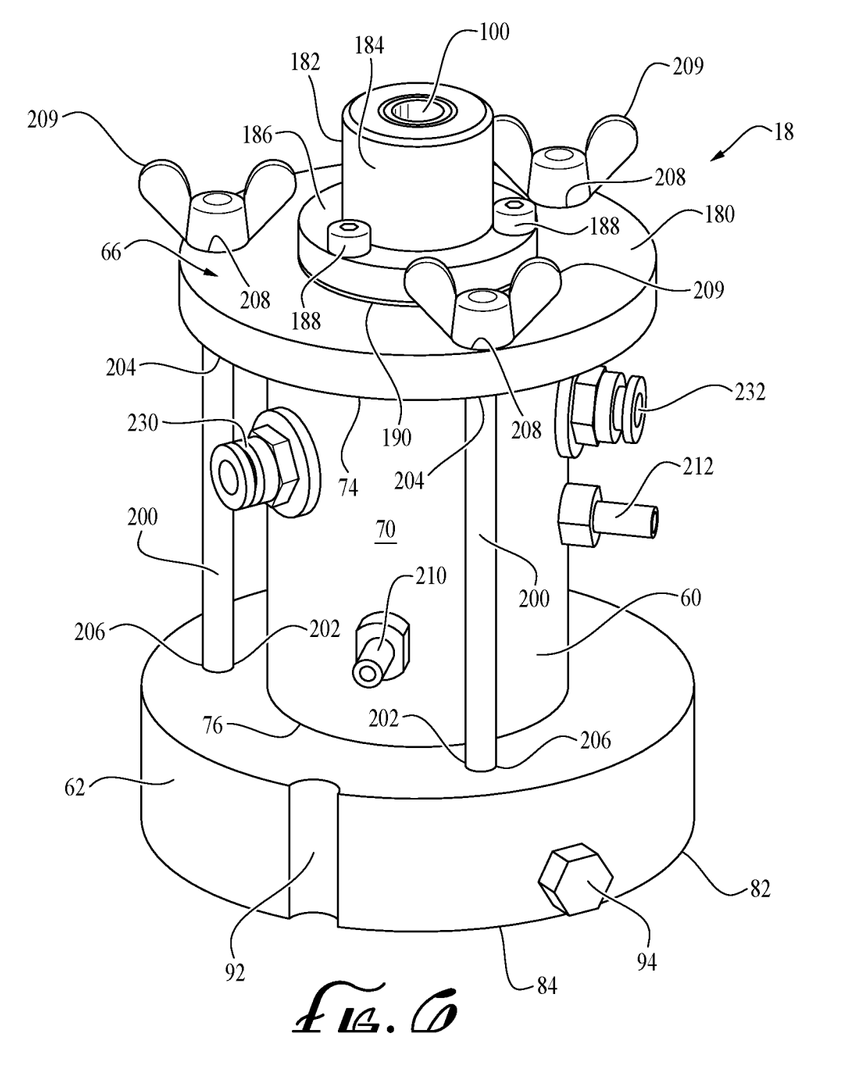
FIG. 6 is an enlarged isometric view of a sample chamber of the material testing system of FIG. 1.

FIG. 6 depicts in greater detail an embodiment of sample chamber 18 assembled from main body 60 positioned between base 62 and lid 66. As shown, lid 66 includes a lid plate 180 to which a flanged cylinder 182 is attached. The flanged cylinder 182 includes a cylindrical body 184 that is integral with a flange base 186 through which a plurality of hex bolts 188 pass to affix flanged cylinder 182 to lid plate 180. A mantle 190 is positioned between flanged cylinder 182 and lid plate 180 to provide a seal between them. Aperture 100 extends through both flanged cylinder 182 and lid plate 180 along longitudinal axis 22 into interior region 78 of main body 60. Lid plate 180 further includes a circular lid-sealing groove (not depicted) sized to receive the cylinder wall 72 of lid end 74 of main body 60. A first rubber ring (not depicted) may be placed in the circular lid-sealing groove between lid plate 180 and lid end 74 of main body 60 to provide a seal between these components. Similarly, base 62 includes a circular base-sealing groove (not depicted) sized to receive the cylinder wall 72 of base end 76 of main body 60. A second rubber ring (not depicted) may be placed in the base-sealing circular groove between base 62 and base end 76 of main body 60 to provide a seal between these components.

A set of three support rods 200, each of which include a first threaded end 202 and a second threaded end 204, allows for the assembly (or disassembly) of sample chamber 18 from (or into) its lid 66, main body 60, and base 62 components. Base 62 includes a set of three equispaced threaded holes 206 proximal to outer perimeter 82. Each of threaded holes 206 is sized to receive the first threaded end 202 of one of the set of three support rods 200. Similarly, lid plate 180 of lid 66 includes a set of three equispaced non-threaded holes 208 axially aligned with threaded holes 206 and sized to allow second threaded ends 204 of each of the set of three support rods 200 to pass through when base 62 and lid 66 are properly rotationally oriented.

When sample chamber 18 is in assembled configuration with main body 60 sandwiched between lid 66 at lid end 74 and base 62 at base end 76, first threaded end 202 of each of support rods 200 is screwed into threaded holes 206 so that support rods 200 are held fixed and extend from base 62 parallel to main body 60 towards lid 66 with second threaded ends 204 passing through non-threaded holes 208 of lid 66. A set of wingnuts 209 is engaged at second threaded ends 204 of support rods 200 and tightened so that main body 60 is compressed between base 62 and lid 66 as support rods 200 are placed in tension. Placement of the first and second rubber rings into the circular lid-sealing groove and circular base-sealing groove (described above), respectively, ensures a leak-proof seal at lid end 74 and base end 76 of main body 60 when wingnuts 209 are tightened to assemble sample chamber 18.

Figure 9:
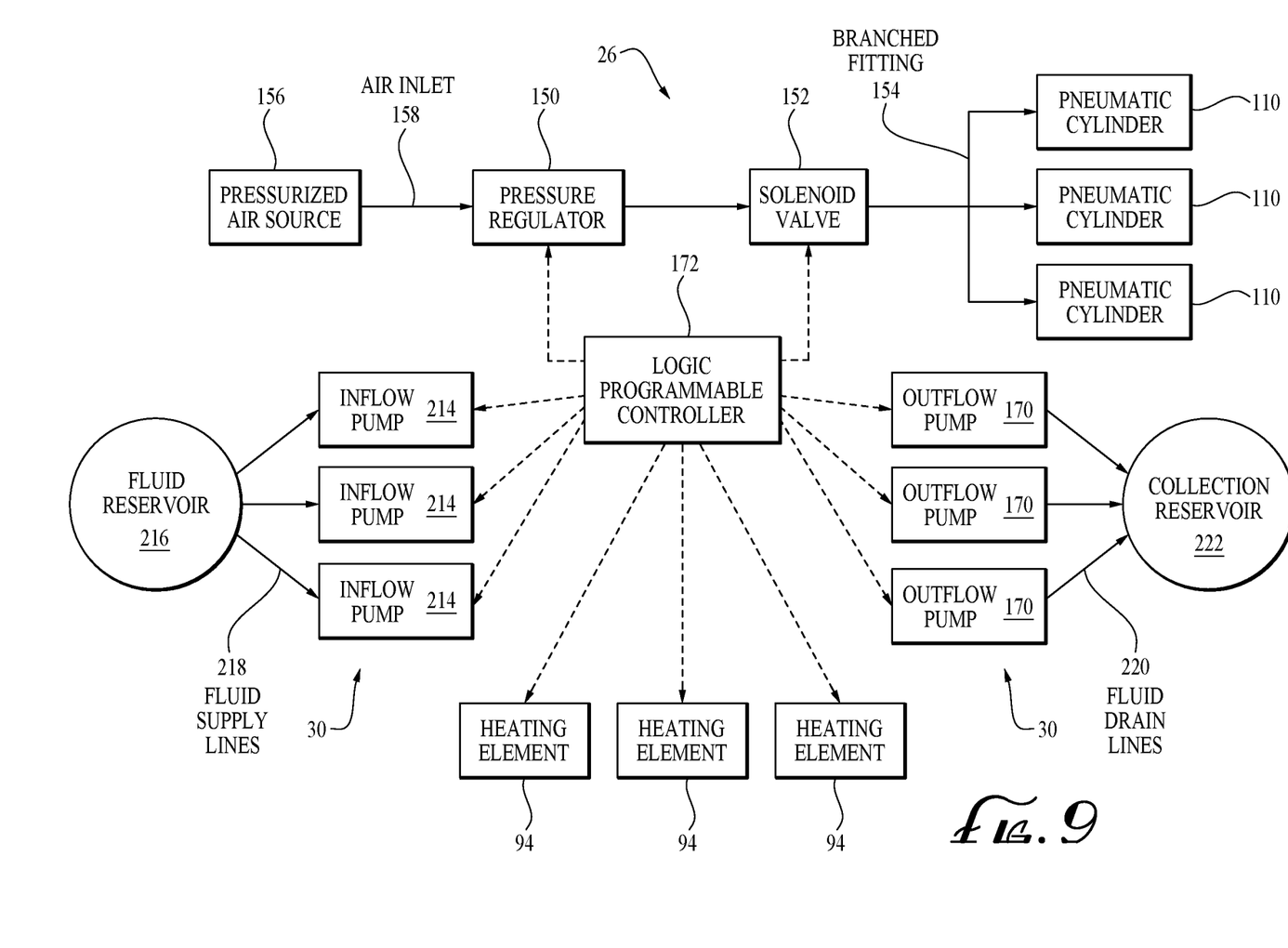
FIG. 9 is a block diagram showing exemplary operational control system interconnections for the material testing system of FIG. 1.

Main body 60 includes a fluid inlet 210 into interior region 78 and a fluid outlet 212 from interior region 78. Fluid inlet 210 is positioned below fluid outlet 212 and cooperates with fluid control system 30 to bathe test sample 28 in a fluid medium inside sample chamber 18 during operation. Fluid control system 30 comprises a set of inflow pumps 214 and a set of outflow pumps 170 configured, respectively, to move the fluid medium from a fluid reservoir 216 (FIG. 9) through a fluid supply line 218 into interior region 78 of main body 60 of sample chamber 18, and to remove the fluid medium from interior region 78 of main body 60 of sample chamber 18 through a fluid drain line 220 to a collection reservoir 222 (FIG. 9). Rates of flow for inflow pumps 214 and outflow pumps 170 are under control of LPC 172 and may be adjusted by user through a user interface 176 to establish desired flow conditions to bathe test sample 28.

Each sample chamber 18 also includes as part of main body 60 a gas inlet 230 and a gas outlet 232 situated above fluid outlet 212 and spanning cylinder wall 72. Gas inlet 230 and gas outlet 232 provide a means for maintaining a desired gas concentration or non-turbulent gas circulation inside sample chamber 18 in the space above the circulating fluid medium. Each of gas inlet 230 and gas outlet 232 is configured for connection to a gas line 234 (FIG. 3) to communicate gas to interior region 78 of sample chamber 18 above the fluid medium. In some applications, a plurality of sample chambers 18 may be connected by gas lines 234 in a series manner, with gas outlet 232 of one sample chamber 18 connected by gas line 234 to gas inlet 230 of another sample chamber 18. Such a series connection allows a uniform gaseous environment to be replicated across multiple sample chambers 18. An example of three sample chambers 18 connected in series through their respective gas inlets 230 and a gas outlets 232 is clearly depicted in the front-side elevation view of FIG. 3. In other applications, each of gas inlets 230 may be may be connected to different gas sources through their respective gas lines 234 so that each sample chamber 18 maintains its own gaseous environment when such testing conditions are desired (not depicted).

Figure 7:
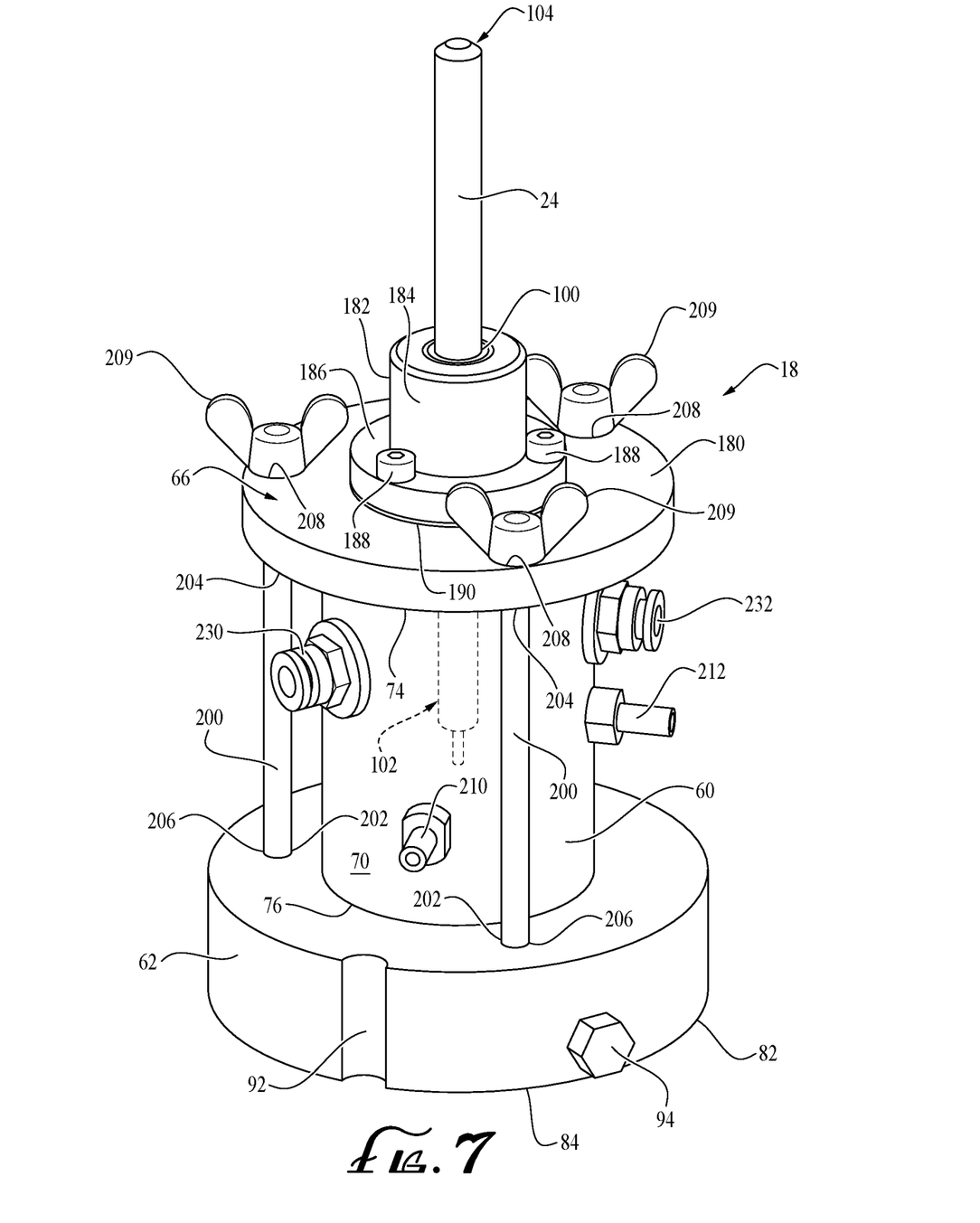
FIG. 7 is an enlarged isometric view of a sample chamber of the material testing system of FIG. 1 showing an actuator rod inserted into the interior region of the sample chamber.

In a preferred embodiment, main body 60 of sample chamber 18 is fabricated using a non-opaque material such as polycarbonate to allow viewing of interior region 78 when sample chamber 18 is assembled. FIG. 7 shows an oblique view of assembled sample chamber 18 with actuator rod 24 inserted into aperture 100 and extending into interior region 78, with first end 102 of actuator rod 24 depicted in dashed lines to indicate that it is viewable through cylinder wall 72 of main body 60.

Figure 8:
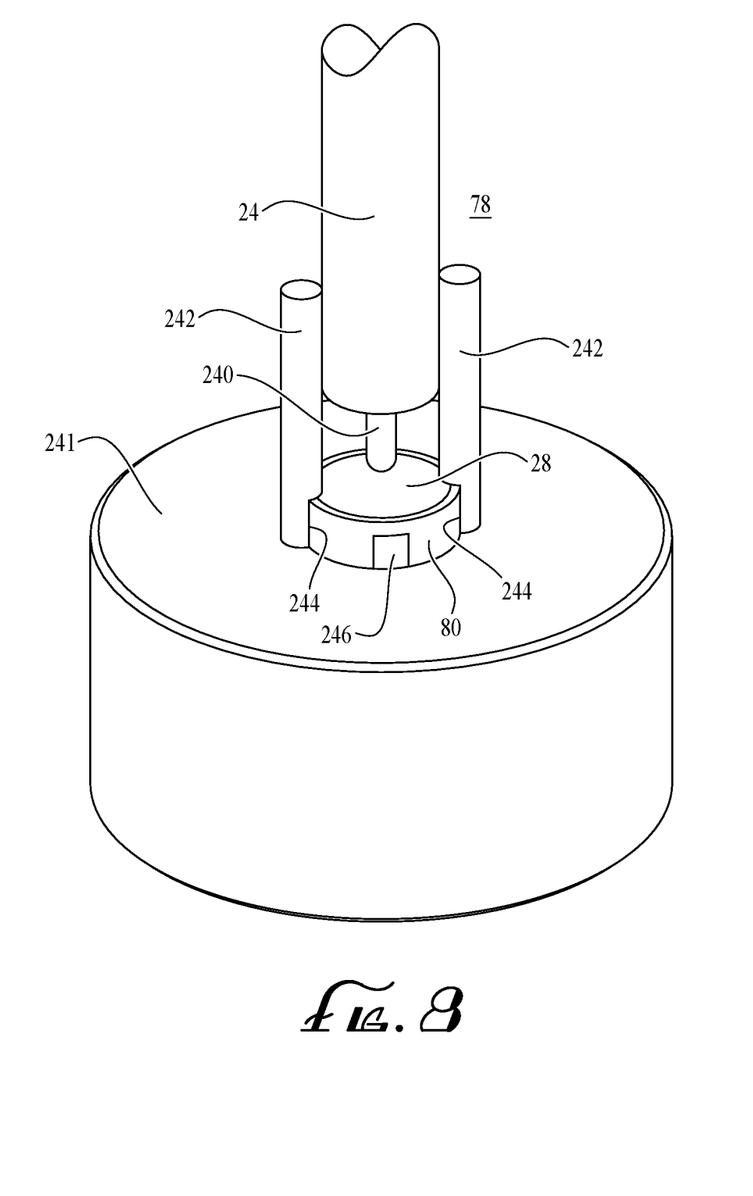
FIG. 8 is an enlarged fragmentary isometric view of an interior region of a sample chamber of the material testing system of FIG. 1, with the main body removed to show rigid platen, support surface, and actuator rod component parts.

FIG. 8 shows an enlarged fragmentary isometric view of sample chamber 18 with main body 60 and base 62 removed to reveal the disposition of mechanical loading components within interior region 78. As shown, actuator rod 24 includes an active tip 240 at first end 102 (FIG. 7) that makes physical contact with test sample 28 resting upon support 80 which, in turn, rests upon a rigid platen 241. A pair of guiding pins 242 extend from rigid platen 241 and are positioned diametrically opposite each other about test sample 28 and support 80. Test sample 28 and support 80 are configured with a pair of notches 244 positioned and sized for alignment with guiding pins 242 to constrain movement of test sample 28 and support 80 on rigid platen 241 during loading. Support 80 includes an integrated fluid passage 246 to allow fluid medium to pass through support 80 and thereby bathe the exposed underside of test sample 28 during testing. It is to be understood that the characteristics of the sample support, test sample, and load application depicted in FIG. 8 are use-specific, and that different configurations may be fixtured or realized depending on testing needs. For example, support 80 and active tip 240 may be configured to engender other loading and boundary conditions on test sample 28 such as, but not limited to, three- or four-point bending, cantilevered bending, or uniaxial compression, and test sample 28 can be reconfigured as needed to manifest a desired stress and strain field during mechanical loading.

FIG. 9 shows an exemplary block diagram of an operational control system for logic programmable controller (LPC) 172 and its interconnection with components of load control system 26, fluid control system 30, and temperature control within sample chambers 18 through heating elements 94. In this block diagram, communication from LPC 172 to various hardware components is depicted using dashed lines with arrowheads. As shown, LPC 172 regulates load control system 26 through electronic communication with pressure regulator 150 and solenoid valve 152. LPC 172 communication with pressure regulator 150 allows control of the magnitude of air pressure delivered to pneumatic cylinders 110 from pressurized air source 156. LPC 172 communication with solenoid valve 152 allows control of the frequency of pressurized air communication to pneumatic cylinders 110. Together, LPC 172 control of pressure regulator 150 and solenoid valve 152 allows control of the load regimen delivered through actuation rods 24 to test samples 28 in their respective sample chambers 18. During operation, for example, when solenoid valve 152 opens, pneumatic cylinders 110 are pressurized and load is applied to test samples 28. When solenoid valve 152 is closed, pressurized air is exhausted to the surrounding environment, thereby relieving pressure within pneumatic cylinders 100 and removing the load applied to test samples 28. The frequency at which solenoid valve 152 cyclically opens and closes to pressurize and depressurize pneumatic cylinders 110, and thereby cyclically load and unload test samples 28, may be user-programmed as necessitated by testing condition requirements. When all pneumatic cylinders 110 are configured with pistons each having the same cross-sectional area, load control system 26 will deliver the same mechanical load regimen to all sample chambers 18, the maximum force during the mechanical load regimen being the product of the piston cross-sectional area and the magnitude of air pressure delivered to pneumatic cylinders 110. Thus, replication of loading conditions across different test samples 28 is readily achieved. User programming of LPC 172 through user interface 176 allows various load-related test parameters to be controlled in a calibrated fashion, such parameters including but not limited to peak load magnitude, loading frequency, duration of run time, and number of loading cycles. It will be appreciated by one skilled in the art that different peak load magnitudes may be delivered to test samples 28 by incorporating into the system pneumatic cylinders 110 having different piston diameters. With such an approach, it is possible to apply different (non-replicated) peak mechanical load magnitudes to test samples 28 across separate sample chambers 18.

FIG. 9 also shows that LPC 172 is configured to regulate fluid control system 30 by electronic communication with each of inflow pumps 214 and each of outflow pumps 170. LPC 172 regulates the rate at which the fluid medium is delivered from fluid reservoir 216 into each sample chamber 18 by modulating the operating speed of its connected inflow pump 214. Similarly, LPC 172 regulates the rate at which the fluid medium is removed from each sample chamber 18 into collection reservoir 222 by modulating the operating speed of its connected outflow pump 170. In a typical application, the rate of inflow and outflow from a sample chamber would be balanced to maintain a constant volume of fluid medium in sample chamber 18 bathing test sample 28. In some applications, however, it may be desirable to dynamically control inflow and outflow rates of the fluid medium to and from sample chamber 18 so that a filling and flushing protocol can be implemented. It will be understood by one skilled in the art that LPC 172 configured as shown in FIG. 9 could be programmed to regulate fluid control system 30 for each sample chamber 18 in such a manner, or according to other fluid flow schemes. It will also be understood that independent control of fluid flow in each sample chamber 18 allows the flexibility to expose test samples 28 in different sample chambers 18 to the same flow conditions or to different flow conditions.

When heating elements 94 are utilized in material testing system 10, LPC 172 may also be used to regulate temperature within individual sample chambers 18. In some embodiments, heating elements 94 may be incorporated into bases 62 of sample chambers 18, into mounting surface 14 of stage 12 upon which sample chambers 18 are set, in rigid platens 241, or positioned external to sample chambers 18 to provide radiant heating. In a typical application, control of heating elements 94 by LPC 172 would be used to maintain a target temperature within interior region 78 of sample chamber 18, for example, maintenance of the bathing fluid medium at a constant temperature. However, it will be understood by one skilled in the art that LPC 172 configured as shown in FIG. 9 could also be used to thermally cycle or vary over time the temperature of the test environment of sample chambers 18 or the temperature of the bathing fluid medium, should such thermal loading conditions be desired.

It is to be understood that while the embodiment of material testing system 10 may house LPC 172 and its accompanying power supply 174 and user interface 176 integrated into stage 12 and housing 130, these components may also exist as separate components in operative communication with material testing system 10. For example, LPC 172, power supply 174, and user interface 176 may be embodied in a computer system such as a laptop computer, desktop computer, or tablet computer configured for wired or wireless communication with the hardware of load control system 26, fluid control system 30, or heating elements 94.

It will be obvious to those having skill in the art that many changes may be made to the details of the above-described embodiments without departing from the underlying principles of the invention. The scope of the present invention should, therefore, be determined only by the following claims.

The invention claimed is:
1. A compact material testing system comprising:
a stage having a mounting surface to which a load alignment frame is operatively connected;
a plurality of sample chambers releasably secured to the mounting surface, each of the plurality of sample chambers including a main body positioned between a base that is located at a first end and a lid that is located at a second end, the base configured for placement on the mounting surface and the lid having an aperture, and the main body having an interior region housing a support on which a test sample can be set;
a plurality of actuator rods, each of which associated with the main body of a different one of the plurality of sample chambers and being slidably movable along a longitudinal axis extending through the interior region, and through the aperture of the lid, of the main body to make contact with the test sample set on the support;
a plurality of load actuators mounted to the load alignment frame and operatively connected to different ones of the plurality of actuator rods, the plurality of load actuators in operative communication with a load control system configured to apply a mechanical loading regimen to the test samples set on the supports;
a fluid inlet to and a fluid outlet from the interior region of the main body of each of the plurality of sample chambers, the fluid inlet positioned below and the fluid outlet positioned above the supports to provide, in cooperation with a fluid control system, a fluid medium bathing the test sample set on the support in the interior region of the main body;
a gas inlet to and a gas outlet from the interior region of the main body of each of the plurality of sample chambers, the gas inlet and the gas outlet positioned above the fluid outlet to provide non-turbulent gas circulation within the interior region above the fluid medium; and
a logic programmable controller configured, in connection with each of the plurality of sample chambers, to control the mechanical loading regimen applied by the load control system and control the flow of the fluid medium into and out of the main body through the fluid control system.

2. The system of claim 1 wherein the fluid control system comprises:
a fluid reservoir containing the fluid medium;
a plurality of inflow pumps, each of which is in communication with the fluid inlet of a different one of the plurality of sample chambers and configured to deliver the fluid medium from the fluid reservoir into the interior region of the sample chamber under control of the logic programmable controller;
a collection reservoir; and
a plurality of outflow pumps, each of which is in communication with the fluid outlet of a different one of the plurality of sample chambers and configured to remove the fluid medium from the interior region of the sample chamber under control of the logic programmable controller to the collection reservoir.

3. The system of claim 1, further comprising a heating element disposed within the base of the sample chamber and configured for communication with the logic programmable controller to control temperature of the fluid medium in the interior region of the main body.

4. The system of claim 3, wherein the logic programmable controller is configured to maintain the fluid medium in each sample chamber at the same temperature.

5. The system of claim 3, wherein the logic programmable controller is configured to maintain the fluid medium in each sample chamber at a different temperature.

6. The system of claim 3, wherein the logic programmable controller is configured to vary the temperature of the fluid medium in each sample chamber over time.

7. The system of claim 1, wherein the plurality of load actuators comprises a plurality of pneumatic cylinders.

8. The system of claim 7, wherein the load control system comprises:
a pressure regulator configured to receive air from a pressurized air source and, in communication with the logic programmable controller, deliver the air at a user-specified pressure magnitude; and a solenoid valve configured to receive the air at the user-specified pressure magnitude from the pressure regulator and, in communication with the logic programmable controller, cyclically pressurize and depressurize the plurality of pneumatic cylinders with the air to impart the mechanical loading regimen to the test sample at a user-specified frequency, a user-specified number of cycles, and a user-specified force.

9. The system of claim 8, wherein the load control system further comprises a branched fitting configured to distribute the air uniformly from the solenoid to the plurality of pneumatic cylinders.

10. The system of claim 1, wherein different peak load magnitudes are configured to be delivered to the test samples in different sample chambers.

11. The system of claim 1, wherein identical peak load magnitudes are configured to be delivered to the test samples in different sample chambers.

12. The system of claim 1, wherein the logic programmable controller is configured to independently control fluid flow in each sample chamber to expose the test samples in different sample chambers to the same flow conditions.

13. The system of claim 1, wherein the logic programmable controller is configured to independently control fluid flow in each sample chamber to expose the test samples in different sample chambers to different flow conditions.

* * * * *